April 9, 1935.  U. QUINTAVALLE  1,997,117

AUTOMATIC BRAKE ACTUATING DEVICE FOR TRAILED VEHICLES

Filed March 23, 1934

Patented Apr. 9, 1935

1,997,117

UNITED STATES PATENT OFFICE 1,997,117

AUTOMATIC BRAKE ACTUATING DEVICE FOR TRAILED VEHICLES

Umberto Quintavalle, Milan, Italy, assignor to Fabbrica Italiana Magneti Marelli Societa' Anonima, Milan, Italy Application March 23, 1934, Serial No. 717,118
In Italy April 10, 1933

8 Claims. (Cl. 188—3)

It is known that vehicles trailed by tractors are required to be provided with an actuating device adapted to apply automatically their wheel brakes in the event such trailed vehicles are accidentally separated from their tractors during travel, and it is also known that for such a purpose brake actuating cylinders operated by fluid pressure are used, such cylinders being in communication with a rubber hose which connects the tractor with the trailed vehicle and is broken when the vehicle coupling means are released or broken, to cause fluid pressure to enter into or escape from brake cylinders in order to operate brake gears.

Such devices are subject to troubles in actual operation in that when said hose or cylinder is accidentally broken while the vehicles are correctly coupled and running or leakages occur therein, the brake gears of the trailed vehicle are unduly operated to apply the brakes.

This invention has for its object an automatic brake actuating device for the above stated purpose in which the brakes of the trailed vehicle wheels are actuated by a direct pull operative thereon at the time the trailed vehicle tends to become separated more than through a predetermined extent from the tractor, said pull being maintained operative at the time of and after the final separation of the trailed vehicle from its tractor.

On the annexed drawing is illustrated by way of example an embodiment of this invention, and Figure 1 is a diagrammatical vertical longitudinal section of a trailed vehicle and of a portion of the rear end of tractor coupled therewith, and provided with the device of this invention;

Figure 1:
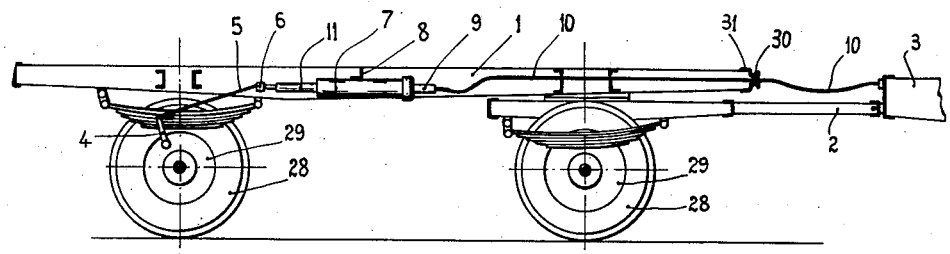

In Figure 1, reference 1 denotes the frame of a trailed vehicle mounted on wheels 28 which are provided with brake gears of any preferred construction enclosed in brake drums 29 and operated by means of arms 4; said arms 4 are connected by tie bars 5 with the head 6 of a transmission member hereinafter described in detail and mounted to reciprocate within a stationary guiding support 7 fastened on a transverse member 8 of the trailer frame 1.

A coupling member as a pole and coupling bar 2 connects the trailed vehicle 1 with rear portion or header 3 of a tractor in the well known manner.

Said transmission member has at its end opposite the head 6, a fork-shaped connecting member 9 which is connected with the rear header 3 of the tractor by a flexible connection as a rope 10 passing through a guide member 30 provided in the front header 31 of the trailed vehicle.

The rope 10 has an extent sufficient to remain in slack condition between the adjacent rear and front headers 3 and 31 of the tractor and trailed vehicle as may normally occur in running and to become tensioned only when the trailed vehicle is released or unduly drags with respect to the tractor, said rope 10 being finally broken only when the stress acting thereon is heavier than that necessary for the brake actuation.

Figure 2:
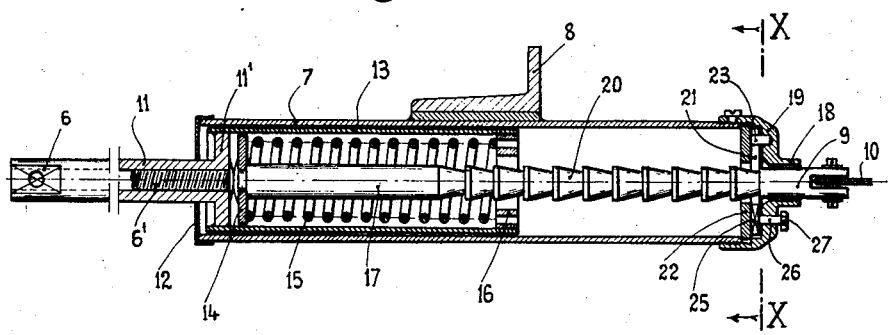
Figure 2 is a central section of the separate device on an enlarged scale with respect to Figure 1.

The transmission member above referred to and illustrated in detail in Figure 2 comprises a tie bar 11 in which a stem 6' of head 6 is screwed to provide for adjusting the overall length of parts 6 and 11, said tie bar 11 having a head 11' fastened in a cylinder 13 which is mounted to reciprocate within guiding support 7. Within said cylinder 13 a plunger 14 connected with a stem 17 is mounted to reciprocate and a spring 15 is located intermediate plunger 14 and apertured head 16 of cylinder 13 opposite to tie bar head 11' to resiliently hold the parts in their position illustrated in Figure 2, with plunger 14 adjacent to tie bar head 11' and stem 17 retracted within cylinder 13.

Said plunger stem 17 extends outwardly through apertured head 16 of cylinder 13 and at its outer end it carries said connecting member 9 which may reciprocate in a collar 18 of a head 19 closing the end of support 7 opposite that carrying head 12 passed through by tie bar 11.

The stem 17 has on a portion of its length adjacent connecting member 9 ratchet means 20 adapted to cooperate with pawl means mounted on head 19, the cooperation of said ratchet and pawl means being such as to enable stem 17 to freely move out from support 7 and to prevent its retraction into said support.

In the illustrated construction, stem 17 in abovestated portion is shaped as a rack bar having a circular cross section, it consisting of a succession of frustroconical parts having their smaller bases pointing towards connecting member 9, to produce triangular section intermediate collars and grooves as illustrated.

The pawl means intended to cooperate with said ratchet portion 20 of stem 17 consists of two jaws 21 mounted to move transversely in support 7 in a space confined intermediate support head 19 and adjacent apertured partition 22 fastened in support 7.

Each of said jaws 21 abuts by one of its ends on an intermediate fulcrum pin 23 and they are acted on by respective springs 24 tending to move them inwardly to engage stem 17; the ends of said jaws opposite the ones bearing on fulcrum pin 23 are engaged by a transversely elongated member 25 fast on a spindle 26 which is loosed in a seat of head 19 and has a manipulating outer head 27 for shifting angularly said spindle 26 and transverse member 25 from outside of head 19.

Figure 3:
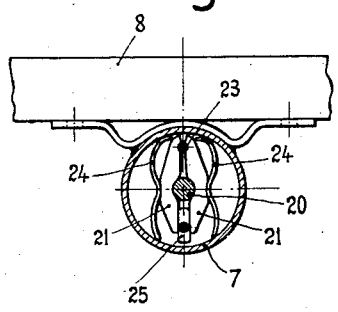
Figure 3 is a transverse section on line X—X of Figure 2 with the parts of the device in operative conditions.

Assuming the parts to be located as shown in Figures 1, 2 and 3, when the coupling member 2 connecting trailed vehicle 1 with tractor 3 is broken or released while the vehicles are running and therefore trailed vehicle 1 drags with respect to tractor 3, the rope 10 is tensioned and it pulls stem 17 out from support 7 causing the plunger 14 of stem 17 to cock or compress spring 15 against head 16 of cylinder 13.

In this operation jaws 21 are caused to spread by each subsequent tapering section 20 against the action of springs 24, and they again come into engaging position at the rear of the larger base of each section 20 under the action of springs 24 as soon as said section has passed beyond them, they being thus in condition to prevent stem 17 and parts connected therewith from retracting from extended position they have been carried into by the pull of rope 10.

At the beginning of the described operation stem 17 produces through parts 14, 15, 16, 13 and 11' a gradual and resilient pull on tie bar 11, owing to described provision of spring 15 intermediate plunger 14 solid with stem 17 and head 16 of cylinder 13 connected with head 11' and tie bar 11, and thus the brake gears are gently actuated by head 6, tie rods 5 and arms 4 to gradually apply the brakes of wheels 28.

The drag of the trailed vehicle being thus increased by the brake application, the pull of rope 10 on stem 17 is increased and this stem is moved out into its fully extended position, causing the brakes of wheels 28 to be entirely applied, and finally the rope 10 is broken, the tensile strength of this rope being predetermined to cause it to be broken out before any other part of the device is injured.

Thus, when the trailed vehicle 1 is separated from the tractor 3 its brakes are fully applied because stem 17 is engaged and locked by jaws 21 in its final position and the spring 15 which is compressed between said stem 17 and tie rod 11 actuating the brake gears, safely holds brakes in fully applied position even in the event the trailed vehicle is left some time in its location in which its separation from tractor occurred.

Figure 4:
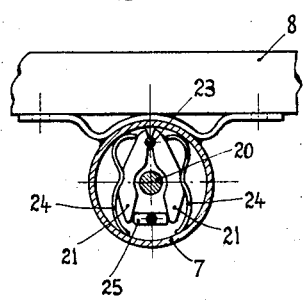
Figure 4 is a similar transverse section on line X—X of Fig. 2 with the device parts in positively released conditions.

To release the brakes of the trailed vehicle 1 the parts 25, 26 and 27 are moved angularly through 90° from the position of Figure 3 to that of Figure 4 by manipulating head 27 and by means of a handle (not shown); then the jaws 21 are positively released from stem 17 which then is free to retract under the action of spring 15, the parts then taking again the position of Figure 2.

Of course the construction and organization of several parts of the device are subject to modifications lying within the spirit of appended claims.

What I claim as my invention and desire to secure by United States Letters Patent is:—

1. A device for automatically applying the brakes of a trailed vehicle when it is separated from its tractor in running, comprising trailed vehicle brake actuating means, a member connected with the tractor for being shifted by a relative motion of said trailed vehicle and tractor, a support stationary on said trailed vehicle, a part mounted to move in said support, a plunger mounted to move with respect to said part, a resilient member operative between said plunger and part, said part being connected with one of said brake actuating means and tractor connected member and said plunger being connected with the other one of them, and means locking said tractor connected member in the final position into which it has been carried by said relative motion of said trailed vehicle and tractor.

2. A device for automatically applying the brakes of a trailed vehicle when it is separated from its tractor in running, comprising trailed vehicle brake actuating means, a member connected with the tractor for being shifted by a relative motion of said trailed vehicle and tractor, a support stationary on said trailed vehicle, a part mounted to move in said support, a plunger mounted to move with respect to said part, a resilient member operative between said plunger and part, said part being connected with one of said brake actuating means and tractor connected member and said plunger being connected with the other one of them, and releasable means locking said tractor connected member in the final position into which it has been carried by said relative motion of said trailed vehicle and tractor.

3. A device for automatically applying the brakes of a trailed vehicle when it is separated from its tractor in running, comprising trailed vehicle brake actuating means, a ratchet member connected with the tractor for being shifted by a relative motion of said trailed vehicle and tractor, a support stationary on said trailed vehicle, a part mounted to move in said support, a plunger mounted to move with respect to said part, a resilient member operative between said plunger and part, said part being connected with one of said brake actuating means and tractor connected member and said plunger being connected with the other one of them, and pawl means in said stationary support for engagement with said ratchet member, said ratchet member and pawl means cooperating to provide for free motion of said ratchet member in one direction under the tractor pull and for preventing its retraction in the opposite direction.

4. A device for automatically applying the brakes of a trailed vehicle when it is separated from its tractor in running, comprising trailed vehicle brake actuating means, a ratchet member connected with the tractor for being shifted by a relative motion of said trailed vehicle and tractor, a support stationary on said trailed vehicle, a part mounted to move in said support, a plunger mounted to move with respect to said part, a resilient member operative between said plunger and part, said part being connected with one of said brake actuating means and tractor connected member and said plunger being connected with the other one of them, and releasable pawl means in said stationary support for engagement with said ratchet member, said ratchet member and pawl means cooperating to provide for free motion of said ratchet member in one direction under the tractor pull and for preventing its retraction in the opposite direction.

5. A device for automatically applying the brakes of a trailed vehicle when it is separated from its tractor in running, comprising trailed vehicle brake actuating means, a cylindrical ratchet member having a sequence of ratchet tapering collars and grooves and connected with the tractor for being shifted by a relative motion of said trailed vehicle and tractor, a support stationary on said trailed vehicle, a part mounted to move in said support, a plunger mounted to move with respect to said part, a resilient member operative between said plunger and part, said part being connected with one of said brake actuating means and tractor connected member and said plunger being connected with the other one of them, pawl members mounted to move in said stationary support transversely to the path of motion of said cylindrical ratchet member, and spring means forcing said pawl members into engagement with said ratchet collars and grooves of said cylindrical ratchet member.

6. A device for automatically applying the brakes of a trailed vehicle when it is separated from its tractor in running, comprising trailed vehicle brake actuating means, a cylindrical ratchet member having a sequence of ratchet tapering collars and grooves and connected with the tractor for being shifted by a relative motion of said trailed vehicle and tractor, a support stationary on said trailed vehicle, a part mounted to move in said support, a plunger mounted to move with respect to said part, a resilient member operative between said plunger and part, said part being connected with one of said brake actuating means and tractor connected member and said plunger being connected with the other one of them, releasable pawl members mounted to move in said stationary support transversely to the path of motion of said cylindrical ratchet member, spring means forcing said pawl members into engagement with said ratchet collars and grooves of said cylindrical ratchet member, and means for releasing said locking means.

7. A device for automatically applying the brakes of a trailed vehicle when it is separated from its tractor in running, comprising trailed vehicle brake actuating means, a cylindrical ratchet member having a sequence of tapering annular ribs and grooves and connected with the tractor for being shifted by a relative motion of said trailed vehicle and tractor, a support stationary on said trailed vehicle, a part mounted to move in said support, a plunger mounted to move with respect to said part, a resilient member operative between said plunger and part, said part being connected with one of said brake actuating means and tractor connected member and said plunger being connected with the other one of them, releasable pawl members mounted to move in said stationary support transversely to the path of motion of said cylindrical ratchet member, spring means forcing said pawl members into engagement with said cylindrical ratchet member, a cam member intermediate said pawl members, means for rotatably supporting said cam member and means for shifting angularly said cam member to leave said pawl members in engagement with said cylindrical ratchet member or to separate said pawl members in opposition to the action of said spring means.

8. A device for automatically applying the brakes of a trailed vehicle when it is separated from its tractor in running, comprising trailed vehicle brake actuating means, a cylindrical ratchet member having a sequence of tapering annular ribs and grooves and connected with the tractor for being shifted by a relative motion of said trailed vehicle and tractor, a support stationary on said trailed vehicle, a cylinder mounted to move in said support, a plunger mounted to move in said cylinder, a compression spring operative between said plunger and cylinder, said cylinder being connected with said brake actuating means and said plunger being connected with said cylindrical ratchet members, releasable pawl members mounted to move in said stationary support transversely to the path of motion of said cylindrical ratchet member, spring means forcing said pawl members into engagement with said cylindrical ratchet member, a cam member intermediate said pawl members, means for rotatably supporting said cam member and means for shifting angularly said cam member to leave said pawl members in engagement with said cylindrical ratchet member or to separate said pawl members in opposition to the action of said spring means.

UMBERTO QUINTAVALLE.